United States Patent Office 3,471,491
Patented Oct. 7, 1969

3,471,491
ADAMANTYL-s-TRIAZINES
Venkatachala L. Narayanan, North Brunswick, N.J., assignor to E. R. Squibb & Sons, Inc., New York, N.Y., a corporation of Delaware
No Drawing. Filed Aug. 28, 1967, Ser. No. 663,481
Int. Cl. C07d 55/20
U.S. Cl. 260—249.9                     8 Claims

ABSTRACT OF THE DISCLOSURE

This invention relates to new adamantyl-s-triazines which are useful as antimicrobial and hypoglycemic agents.

---

This invention relates to new adamantyl-s-triazines of the formula

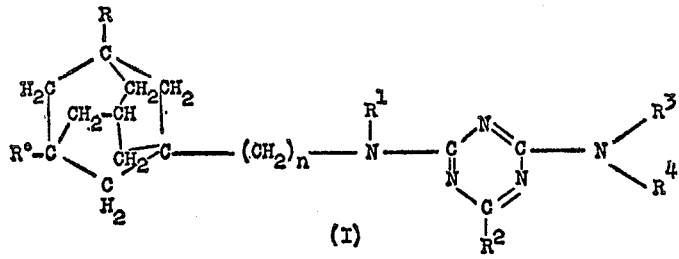

and acid-addition salts thereof.

In the above formula R and $R^0$ each represents hydrogen, halogen, lower alkyl, lower alkoxy, phenyl or phenyl-lower alkyl (the R's can be the same or different), $R^1$ represents hydrogen or lower alkyl, $R^2$ represents hydrogen, lower alkyl or halo-lower alkyl, $R^3$ and $R^4$ each represents hydrogen, lower alkyl or phenyl-lower alkyl and $n$ represents 0, 1 or 2.

The lower alkyl groups represented by the symbols R are straight or branched chain aliphatic hydrocarbon radicals such as methyl, ethyl, propyl, isopropyl, butyl, s-butyl, t-butyl, amyl, and the like. The lower alkoxy and phenyl-lower alkyl groups are radicals of the same character including an oxygen atom or phenyl group, respectively. The halo-lower alkyl groups include one or more halogens attached to an alkyl group of the character described, e.g., chloromethyl, bromomethyl, dichloroethyl, trifluoromethyl, and the like.

The new compounds of Formula I are produced from compounds of the formula

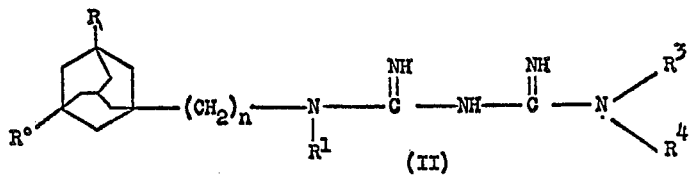

wherein the symbols have the same meaning as in Formula I, by reaction with a carboxylic acid or derivative thereof having the formula $$R^2\text{—CO—X}$$

$R^2$ having the same meaning as in Formula I and X representing the residual moiety of the acid, acid halide, acid anhydride or ester. The reaction of the compound of Formula I with the acid or derivative is effected in alcoholic medium with or without a basic catalyst. Suitable acid or derivatives include for example formic acid, trichloroacetic acid, acetic anhydride, acetyl chloride, and ethyl formate.

Compounds of Formula II may be produced by a variety of methods. The hydrochloride of a primary or secondary amine, containing the desired adamantyl group, is fused with dicyandiamide or a substituted dicyanidiamide (substituted cyanoguanidine) and the substituted biguanide hydrochloride is recovered from the reaction mixture. Alternatively, the hydrochloride of the primary or secondary amine is reacted with sodium dicyanamide in aqueous butanol to yield the adamantyl substuted dicyandiamide, which is then fused with the hydrochloride of the appropriate primary or secondary amine.

Suitable starting amines for compounds of Formula I include for example, 1-adamantylamine, 3-methyl-1-adamantylamine, 3-phenyl-1-adamantylamine, 3-fluoro, 3-chloro, 3-bromo and 3-iodo-1-adamantylamine, 3,5-dimethyl-1-adamantylamine as well as the adamantyl-lower alkylamines and the N-alkyl compounds corresponding to the above.

Suitable dicyandiamides (cyanoguanidines) for the preparation of compounds of Formula I include dicyandiamide, 3-cyano-1-methylguanidine, 3-cyano-1-ethylguanidine, 3-cyano-1-propylguanidine, 3-cyano-1-isopropylguanidine, 3-cyano-1-isobutylguanidine, 3-cyano-1,1-diethylguanidine and 3-cyano-1-methyl-1-benzylguanidine among others.

The bases of Formula I form acid-addition salts with a variety of inorganic and organic acids. Such salts include, for example, the hydrohalides, e.g., hydrochloride, hydrobromide, etc., sulfate, phosphate, nitrate, sulfonates, e.g., camphorsulfonate, benzenesulfonate, toluenesulfonate, etc., citrate, oxalate, ascorbate, acetate, tartrate, salicylate, and the like. It is frequently most convenient to isolate the compound by forming the acid salt by reaction with an inorganic or organic acid and precipitating it in a medium in which it is insoluble. The free base may then be obtained by neutralization.

The new compounds of this invention are useful as antimicrobial agents, e.g., as antiviral agents, for example against influenza virus such as A–PR8 or hepatic virus such as MHV$_3$, or as antibacterial agents for example, against Staphylococci or Diplococci. They may be used as antiseptic or disinfectants for control or elimination of airborne or environmental microbes, e.g., in sprays, aqueous solutions, emulsions or suspensions of up to about 10% concentration. They may also be used orally or parenterally to combat microbial infestation of such organisms in animal species affected by them by oral or parenteral administration of 5 to 40 mg./kg. three or four times daily of a compound of Formula I or a physiologically acceptable acid-addition salt thereof (or basic salt when $R^2$ is hydrogen) in conventional dosage forms such as tablets, capsules, injectables, or the like.

The compounds of this invention also are hypoglycemic agents which are effective in lowering blood sugar content in animal species. Long duration of action is a noteworthy feature. They may be administered orally in the form of tablets, capsules or elixirs, or the like, by incorporating the appropriate dosage (e.g., about 10 to 50 mg./kg. three to four times daily) of the base of Formula I or a physiologically acceptable acid-addition salt in a conventional vehicle together with excipients, lubricants, preservatives, stabilizers, and the like, as required, according to accepted pharmaceutical practice.

The following examples are illustrative of the invention. All temperatures are expressed in the centigrade scale.

EXAMPLE 1

Preparation of 2-(1-adamantylamino)-4-amino-s-triazine (1) Preparation of 1-(1-adamantyl)biguanide hydrochloride.—A finely ground mixture of 9.38 g. of adamantylamine hydrochloride and 4.2 g. of dicyandiamide is heated on an oil bath to 170° (external temperature of 200°). The molten mass solidifies at this point and the mixture is maintained at 170° for one hour. After cooling, the hard solid cake is dissolved in 700 ml. of absolute alcohol and filtered. Addition of N-hexane results in the precipitation of 7.2 g. of a white solid, showing a C≡N absorption at 4.4µ. The above material is chromatographed over neutral alumina, and the fraction showing no nitrile absorption is concentrated and crystallized from alcohol-hexane to give 2.5 g. of 1-(1-adamantyl)biguanide hydrochloride, M.P. 260–261°.

(2) Preparation of 2-(1-adamantylamino)-4-amino-s-triazine.—To a cooled solution of 5.4 g. (0.02 mole) of 1-(1-adamantyl)biguanide hydrochloride in 200 ml. of methyl alcohol, 30 ml. of a 1.6% solution of sodium in dry methyl alcohol is added, followed by a solution of 1.5 g. of ethyl formate in 10 ml. of methanol. In fifteen minutes a precipitate appears, and the reaction mixture is stirred overnight at room temperature. The mixture is diluted with 50 ml. of water, cooled and filtered to give 4.2 g. of white solid. It is crystallized twice from isopropyl alcohol and dried at 120° in vacuo to give 3.2 g. of 2-(1-adamantylamino)-4-amino-s-triazine as shiny white plates, M.P. 279–280°.

EXAMPLE 2

Preparation of 2-[(1-adamantylmethyl)amino]-4-amino-s-triazine (1) Preparation of 1-adamantane carboxylic acid chloride.—To 18 g. of 1-adamantane carboxylic acid 50 ml. of thionyl chloride is added with cooling, and the mixture is heated under reflux for thirty minutes. The excess of thionyl chloride is removed in vacuo. The addition of 2× 30 ml. of dry benzene (benzene dried over silica gel) and evaporation serving to remove the last traces. Anhydrous ether (30 ml.) is added and the solution evaporated leaving 19.2 g. (792%) of 1-adamantanecarboxylic acid chloride as a brownish white solid;

$\lambda_{max}^{Nujol}$ 5.16µ (C=O of acid chloride)

(2) Preparation of 1-adamantanecarboxamide.—1-adamantanecarboxylic acid chloride (35 g.) dissolved in 70 ml. of dry tetrahydrofuran, is added to a well-cooled aqueous ammonia solution. A white precipitate appears and the mixture is then stirred for 0.5 hour. The precipitate is filtered, washed with water to neutrality and dried over phosphorus pentoxide in vacuo to give 30.1 g. of 1-adamantanecarboxamide; M.P. 186–187.5°;

$\lambda_{max}^{Nujol}$ 5.95µ (C=O of amide)

(3) Preparation of 1-adamantylmethylamine.—To a well-stirred suspension of 30 g. of lithium aluminum hydride in 1000 ml. of dry ether, 27 g. (0.15 mole) of 1-adamantanecarboxamide is added in portions over a period of 1.5 hour. After the addition, the reaction mixture is stirred at room temperature for 1 hour, and then is refluxed with stirring for 4 hours, and finally is allowed to stand overnight at room temperature. The suspension is well-cooled and 50 ml. of water is added dropwise with vigorous stirring. This is followed by the addition of 100 ml. of 10% sodium hydroxide solution. The ethereal layer is separated and the solid is extracted three times with ether. The combined ethereal layer is dried (MgSO$_4$) and evaporated in vacuo to give 14.5 g. of product.

(4) Preparation of 1-adamantylmethylamine hydrochloride.—1-adamantylmethylamine (14.5 g.) is dissolved in 50 ml. of anhydrous ether and 200 ml. of ethereal hydrogen chloride is added. The precipitated hydrochloride (18.1 g.) is collected and crystallized from methanol ether to give 1-adamantylmethylamine hydrochloride as shiny white needles, M.P. over 280°.

(5) Preparation of 2-[(1-adamantyl ethyl)amino]-4-amino-s-triazine.—Following the procedure of Example 1 (steps 1 and 2) but substituting 1-adamantylmethylamine hydrochloride, there is obtained 2-[(1-adamantylmethyl)amino]-4-amino-s-triazine, M.P. 244.5–246.5°.

EXAMPLE 3

Preparation of 2-[(1-adamantylethyl)amino]-4-amino-s-triazine (1) Preparation of 1-adamantylacetic acid.—A solution of 25 g. of 1-bromoadamantane in 100 g. of dichloroethylene is added dropwise during 1.5 hours to 100 ml. of sulphuric acid (90%) containing 18 g. of borontrifluoride. The temperature is maintained between 8–10°. After stirring for three hours at 10°, crushed ice is gradually added, and the mixture diluted with water. The crude precipitate (26.5 g.) is dissolved in 10% sodium hydroxide solution, and the cloudy solution is extracted once with ether. The basic solution is cooled, and acidified with 5% hydrochloric acid. The 1-adamantylacetic acid that precipitates is collected and dried to give 21.5 g. of white solid, M.P. 130–133°, the analytical sample crystallizes from methanol-water as long white needles; M.P. 134–136°.

Analysis.—Calc'd for $C_{12}H_{18}O_2$: C, 74.19; H, 9.34. Found: C, 74.24; H, 9.84.

(2) Preparation of 1-adamantaneacetic acid chloride is prepared similar to 1-adamantanecarboxylic acid chloride but using 1-adamantaneacetic acid (Example 1 (1)) as starting material.

(3) Preparation of 1-adamantaneacetamide is prepared similar to 1-adamantanecarboxamide (Example 1 (2)), M.P. 166–168°.

(4) Preparation of 1-adamantylethylamine hydrochloride.—This compound is prepared similar to 1-adamantylmethylamine hydrochloride (Example 2 (3) and (4)). It separates as white crystals from methanol-ether, M.P. over 280°.

(5) Preparation of 2-[(1-adamantylethyl)amino]-4-amino-s-triazine.—Following the procedure of Example 1 (steps 1 and 2) but substituting 1-adamantylethylamine hydrochloride, there is obtained 2-[(1-adamantylethyl) amino]-4-amino-s-triazine.

Similarly by reacting the indicated adamantyl biguanide, with the indicated carboxylic acid with derivative, in the procedure of Example 1 when n is 0, or in the procedure of Example 2 when n is 1, or in the procedure of Example 3 when n is 2, the corresponding substituted adamantyl-s-triazine is obtained.

Adamantyl biguanide

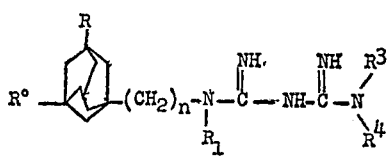

Carboxylic acid or its derivative $R^2$—CO—OC$_2$H$_5$

Adamantyl-s-triazine

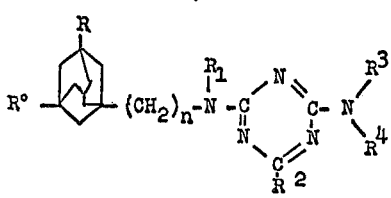

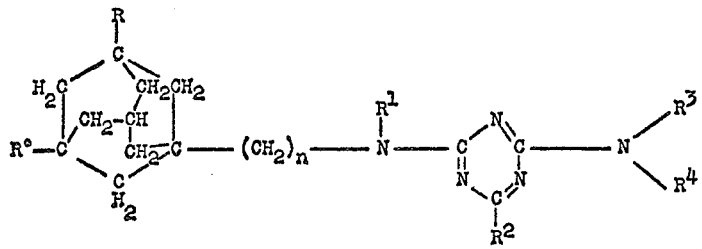

Example 4: R=CH$_3$, R$^0$=H, R$^1$=H, R$^2$=H, R$^3$=R$^4$=H, $n$=0.
Example 5: R=CH$_3$, R$^0$=H, R$^1$=H, R$^2$=H, R$^3$=R$^4$=H, $n$=1.
Example 6: R=OCH$_3$, R$^0$=H, R$^1$=H, R$^2$=H, R$^3$=R$^4$=H, $n$=0.
Example 7: R=OCH$_3$, R$^0$=OCH$_3$, R$^1$=H, R$^2$=H, R$^3$=R$^4$=CH$_3$, $n$=1.
Example 8: R=H, R$^0$=H, R$^1$=C$_2$H$_5$, R$^2$=H, R$^3$=R$^4$=C$_2$H$_5$, $n$=0.
Example 9: R=H, R$^0$=H, R$^1$=C$_2$H$_5$, R$^2$=H, R$^3$=R$^4$=C$_2$H$_5$, $n$=2.
Example 10: R=CH$_3$, R$^0$=CH$_3$, R$^1$=C$_2$H$_5$, R$^2$=H, R$^3$=R$^4$=H, $n$=1.
Example 11: R=H, R$^0$=H, R$^1$=H, R$^2$=CH$_3$, R$^3$=R$^4$=H, $n$=1.
Example 12: R=H, R$^0$=H, R$^1$=H, R$^2$=CCl$_3$, R$^3$=R$^4$=H, $n$=1.
Example 13: R=H, R$^0$=C$_6$H$_5$, R$^1$=H, R$^2$=H, R$^3$=H, R$^4$=CH$_3$, $n$=1.
Example 14: R=H, R$^0$=CH$_2$C$_6$H$_5$, R$^1$=H, R$^2$=H, R$^3$=R$^4$=CH$_2$C$_6$H$_5$, $n$=1.
Example 15: R=H, R$^0$=H, R$^1$=H, R$^2$=H, R$^3$=R$^4$=CH$_3$, $n$=1.
Example 16: R=CF$_3$, R$^0$=H, R$^1$=H, R$^2$=H, R$^3$=R$^4$=C$_2$H$_5$, $n$=0.

The invention may be variously otherwise embodied within the scope of the appended claims.

What is claimed is:
1. A compound of the formula wherein R and R$^0$ each is hydrogen, halogen, lower alkyl, lower alkoxy, or phenyl-lower alkyl, R$^1$ is hydrogen or lower alkyl, R$^2$ is hydrogen, lower alkyl or halo-lower alkyl, R$^3$ and R$^4$ each is hydrogen, lower alkyl or phenyl-lower alkyl, and $n$ is 0, 1 or 2, and salts thereof.

2. A compound according to claim 1 wherein R, R$^0$, R$^1$, R$^2$, R$^3$ and R$^4$ are all hydrogen and $n$ is 0.

3. A compound according to claim 1 wherein R, R$^0$, R$^1$, R$^2$, R$^3$ and R$^4$ are all hydrogen and $n$ is 1.

4. A compound according to claim 1 wherein R, R$^0$, R$^1$, R$^2$, R$^3$ and R$^4$ are all hydrogen and $n$ is 2.

5. A compound according to claim 1 wherein R, R$^0$, R$^1$ and R$^2$ are all hydrogen, R$^3$ and R$^4$ each is lower alkyl and $n$ is 1.

6. A compound according to claim 1 wherein R, R$^0$, R$^1$ and R$^2$ are all hydrogen, R$^3$ and R$^4$ each is methyl and $n$ is 1.

7. A compound according to claim 1, wherein R is methyl, R$^0$, R$^1$, R$^2$, R$^3$ and R$^4$ are all hydrogen and $n$ is 0.

8. A compound according to claim 1, wherein R is trifluoromethyl, R$^0$, R$^1$ and R$^2$ are all hydrogen, R$^3$ and R$^4$ each is ethyl and $n$ is 0.

References Cited

UNITED STATES PATENTS 3,305,348   2/1967   Schwarze et al. __ 260—249.9 XR

OTHER REFERENCES

Netherlands printed application, 6408505, Jan. 25, 1965, abstracted.
Chemical Abstracts, vol. 63, cols. 516–7 (1965).

HENRY R. JILES, Primary Examiner

JOHN M. FORD, Assistant Examiner

U.S. Cl. X.R.

260—564, 999